United States Patent [19]

Chen et al.

[11] Patent Number: 5,235,014
[45] Date of Patent: Aug. 10, 1993

[54] HIGH-REFRACTIVITY PLASTIC LENS RESIN

[75] Inventors: Chih-Chiang Chen, Hsinchu; Rong-Jer Lee, Yun-Lin Hsien, both of Taiwan

[73] Assignee: Industrial Technology Research Institute, Chutung, Taiwan

[21] Appl. No.: 875,346

[22] Filed: Apr. 29, 1992

[51] Int. Cl.$^5$ .................... C08F 26/02; C08F 216/08; C08F 12/24

[52] U.S. Cl. ................ 526/301; 526/307.5; 526/310; 526/313

[58] Field of Search .......................... 526/301

[56] References Cited

U.S. PATENT DOCUMENTS 4,443,588  4/1984  Fukuda et al. ............... 526/301

Primary Examiner—Joseph L. Schofer
Assistant Examiner—Wu C. Cheng
Attorney, Agent, or Firm—Ladas & Parry

[57] ABSTRACT

Disclosed herein are a high-refractive plastic lens resin consisting of a polymeric reaction product obtained by an addition reaction under heat of at least one polyisocyanate represented by the following general formula (I):

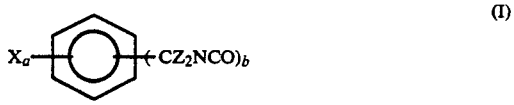

wherein X is a hydrogen, chlorine or bromine atom or a methyl or ethyl group, Z is a hydrogen atom or a methyl group, $1 \leq a \leq 4$, $2 \leq b \leq 4$, and $a+b \leq 6$, with at least one allyl group compound represented by the following general formula (II):

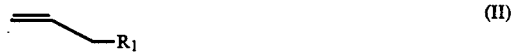

wherein $R_1$ is a phenol, hydroxyl, or amine group, in such amounts that the $-NCO/-OH + -NH_2$ molar ratio fall within the range from 0.45 to 0.50.

2 Claims, No Drawings

HIGH-REFRACTIVITY PLASTIC LENS RESIN

BACKGROUND OF THE INVENTION

1. Field of the Invention

This invention relates to a high-refractivity plastic lens resin having a composition containing diallyl-based urethane and urea resin.

2. Description of the Related Art

Plastic lenses have been finding utility as eye lenses and camera lenses and in optical devices in recent years since they are lighter, less fragile and dyeable compared with inorganic lenses. As a resin employed widely for these applications these days, there is a resin obtained by subjecting diethylene glycol bisallylcarbonate (hereinafter called "CR-39") to radical polymerization. This resin has various merits, such as excellent impact resistance, light weight, superb dyeability, and good machanicability. Its refractivity is, however, small ($n_D = 1.50$) compared with inorganic lenses ($n_D = 1.52$). In order to achieve optical characteristics equivalent to glass lenses, it is essential to increase the central thickness, peripheral thickness and curvature of a lens, thereby unavoidably increasing the overall thickness of the lens. There is hence an outstanding demand for the development of a lens resin having a higher refractivity in order to overcome this inconvenience. As lens resins which can purportedly materialize higher refractivity, there have been proposed polycarbonate ($n_D = 1.58$ to 1.59) and polystyrene ($n_D = 1.59$ to 1.60), which are thermoplastic resins and which are therefor difficult to be processed into eyeglass lenses. The development of a lens resin which has high refractivity ($n_D > 1.6$) and which can be processed by a cast-molding method, as CR-39 can be, is therefore desired. It was proposed that resins be obtained by a reaction between a polyisocyanate and polyols or mercapto group compound. However, these resins have gas bubbles formed therein during the polymerization process and are difficult to release from a mold. It is necessary to pretreat the glass or metal lens mold surface with a proper external mold releasing agent in order to form a release mold. However, the thickness of this release mold is difficult to control, and the precision degree of the lens surface is therefore difficult to maintain, resulting in the attachment of part of the lens resin to the release mold and damage on the surface of the lens. Alternatively, a proper internal mold releasing agent may be used for releasing purposes. The solubility of this internal mold releasing agent is small with respect to the mixture of polyisocyanate and polymercapto group compound, reducing the transparent degree of the lens resin.

SUMMARY OF THE INVENTION

It is therefore a main object of this invention to provide a high refractivity plastic lens resin which has no gas bubble formed therein and which can be easily released from a mold when it is manufactured.

In one aspect of this invention, there is thus provided a high-refractivity plastic lens resin consisting essentially of a polymeric reaction product obtained by an addition reaction under heat of at least one polyisocyanate represented by the following general formula (I):

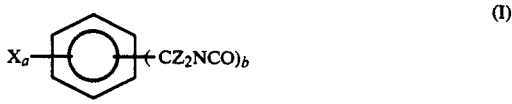

wherein X means a hydrogen, chlorine or bromine atom or a methyl or ethyl group, Z is a hydrogen atom or a methyl group, $1 \leq a \leq 4$, $2 \leq b \leq 4$, and $a + b \leq 6$, with at least one allyl group compound represented by the following general formula (II):

wherein $R_1$ means a phenol, hydroxyl, or amine group, in such amounts that the $-NCO/(-OH + -NH_2)$ molar ratio falls within 0.45 to 0.50.

At least one polyisocyanate represented by the general formula (I) is reacted with at least one allyl group compound represented by the general formula (II) at the temperature of 70° to 90° C. in a closed container. The content of isocyanate group is back-titrated with butyl diamine at an interval of 30 minutes until there is no isocyanate group in the mixture in order to ensure that the reaction is completed. Thereafter, at least one dilution agent which is selected from styrene, halo-styrene and diallyl phthalic acid is added into the solution, so that the mixture is in a liquid state at room temperature. After the addition of peroxy diisopropyl benzene, the resultant mixture is then processed by a known cast-molding technique; namely, it is poured in a mold formed in combination of a glass mold and resin gasket, followed by its heating and curing for several hours at a temperature of 90°-150° C. The lens resin of this invention thus obtained is transparent and has a high refractive index. It is excellent in machinability, heat resistance, solvent resistance and impact resistance. It is hence suitable for use as eyeglass lenses and camera lenses and in other optical devices. Additives such as anti-oxidization agents, yellowing resistance agents and ultraviolet light stabilization agents may be added into the mixture before the casting molding processes in accordance with physical properties required.

Isocyanate group is prone to react with water, resulting in the production of gas bubbles and in the difficulty of using mold-releasing processes when manufacturing the lens resins. However, in accordance with the present invention, the isocyanate group and the hydroxyl or amine group react to remove completely the isocyanate group from the mixture, and the lens resin produces a molding shrinkage effect when a diallyl group is used in the polymerization processes. Therefore, the production of gas bubbles and the difficulty of mold-releasing processes can be avoided.

DETAILED DESCRIPTION OF THE PREFERRED EMBODIMENTS

The present invention will be described in more detail by the following Examples in which "part(s)" represents "weight parts" and "%" represents "% weight." Examples were measured or determined respectively in accordance with the following testing methods.

Refractive index and Abbe number:

Measured at 20° C. by means of a Kalnew refractometer to determine $n_D$, $n_F$ and $n_C$ values. Abbe number is determined by the following formula:

$$Abbe\ No. = (n_D - 1)/(n_F - n_C)$$

Heat cracking resistance:
A lens was placed in a hot air furnace at 120° C. for 3 hours. The heat cracking resistance is rated good (o) where the lens did not crack or break.
Solvent resistance:
A lens was dipped in a solution containing acetone, isopropanol and benzene at room temperature for two days and then removed from the solution. The solvent resistance is rated good (o) where the surface of the lens did not change.
Specific gravity:
Measured by ASTM D-792 method.
Surface hardness:
Measured by ASTM D-3363 method.
Water absorption ratio:
Measured by ASTM D-570 method in which a lens is dipped at room temperature for 24 hours.
Transmission ratio:
Measured by ASTM D-1003 method in which the lens has a thickness of 2 mm and was tested at a wavelength of 580 nm.
Impact resistance:
Using a ball having a diameter of 22 mm and a weight of 44 g which falls from a height of 127 cm in accordance with the FDA standards. The impact resistance is rated good (o) where the center of the lens did not crack or break while being hit by the ball.

EXAMPLE 1

Uniformly mixed were 30 parts of m-xylylene diisocyanate and 18.5 parts of allylalcohol. The mixture was heated at 80° C. for 3 hours to form a compound-A containing diallyl-based urethane.

EXAMPLE 2

Uniformly mixed were 30 parts of m-xylylene diisocyanate and 42.7 parts of allylphenol. The mixture was heated at 80° C. for 3 hours to form a compound-B containing diallyl-based urethane.

EXAMPLE 3

Uniformly mixed were 30 parts of m-xylylene diisocyanate and 18.2 parts of allylamine. The mixture was heated at 80° C. for 4 hours to form a compound-C containing diallyl-based urethane.

EXAMPLE 4

Uniformly mixed at 80° C. were 100 parts of liquid compound-A obtained from Example 1 and 3 parts of peroxy diisopropyl benzene. The resultant mixture was poured into a glass mold and heated at 120° C. for 3 hours to polymerize the mixture. The lens thus obtained had a high refractive index ($\geq 1.6$) and was excellent in heat resistance, chemical resistance, etc. The lens was tested, and the test results are shown in Table 1.

EXAMPLE 5

Uniformly mixed were 60 parts of liquid compound-A obtained from Example 1 and 40 parts of styrene to form a liquid mixture. The liquid mixture was then added which 3 parts of peroxy diisopropyl benzene. The resultant mixture was poured into a glass mold and heated at 120° C. for 5 hours to polymerize the mixture. The lens thus obtained was tested, and the test results are shown in Table 1.

EXAMPLES 6-9

Following the procedure of Example 4, lenses were produced separately from the compositions given in Table 1. Test results are also shown in the same table.

COMPARATIVE EXAMPLE 1

An attempt was made to mix 94 parts of m-xylylene diisocyanate with 122 parts of pentaerythritol tetrakis(mercaptopropionate) and 0.05 parts of dilauric dibutyl stannate. The mixture was then heated at 60° C. for three hours to undergo a polymerization reaction. The resultant mixture was cooled and the lens resin thus obtained could not be removed from the glass mold and had gas bubbles produced therein.

COMPARATIVE EXAMPLE 2

Following the procedure of Comparative Example 1, lenses were produced with an external mold release agent being applied to the inside of the glass mold so as to facilitate the release of the resulting resin after the molding. The lens had an uneven surface and gas bubbles contained therein.

TABLE 1

| | Composition (parts) | $n_D$ | $v_D$ | Transmission ratio (%) | Specific gravity | Hardness (H) | WAR (%) (24 hrs) | Crack resist. | Impact resist. | Solvent resist. | Mold release | Gas bubble |
|---|---|---|---|---|---|---|---|---|---|---|---|---|
| Ex. | | | | | | | | | | | | |
| 3 | Compound-A (100) | 1.602 | 34 | 90 | 1.24 | 4 | 0.20 | o | o | o | o | No |
| 4 | Compound-A (60) Styrene (40) | 1.601 | 30 | 90 | 1.12 | 4 | 0.16 | o | o | o | o | No |
| 5 | Compound-B (100) | 1.621 | 29 | 88 | 1.29 | 4 | 0.19 | o | o | o | o | No |
| 6 | Compound-B (60) Styrene (40) | 1.611 | 30 | 89 | 1.18 | 3 | 0.17 | o | o | o | o | No |
| 7 | Compound-C (100) | 1.615 | 35 | 89 | 1.25 | 4 | 0.16 | o | o | o | o | No |
| 8 | Compound-C (60) Styrene (40) | 1.606 | 33 | 89 | 1.16 | 4 | 0.12 | o | o | o | o | No |
| Comp. Ex. | | | | | | | | | | | | |
| 1 | m-XDI (94) PEMP (122) | — | — | — | — | — | — | — | — | — | x | Yes |
| 2 | m-XDI (94) PEMP (122) External mold | 1.60 | 35 | 90 | 1.29 | 4 | 0.20 | o | o | o | o | Yes |

TABLE 1-continued

| Composition (parts) | $n_D$ | $v_D$ | Transmission ratio (%) | Specific gravity | Hardness (H) | WAR (%) (24 hrs) | Crack resist. | Impact resist. | Solvent resist. | Mold release | Gas bubble |
|---|---|---|---|---|---|---|---|---|---|---|---|
| releasing treatment | | | | | | | | | | | |

Note:
XDI-xylylene diisocyanate.
PEMP-pentaerythritol tetrakis(mercaptopropionate)
WAR-water adsorption ratio (24 hours)

I claim:

1. A high-refractivity plastic lens resin consisting essentially of a polymeric reaction product obtained by the polymerization of the production obtained by an addition reaction under heat of at least one polyisocyanate represented by the following general formula (I):

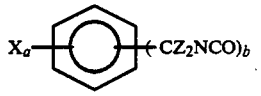
(I)

wherein X is a hydrogen, chlorine or bromine atom or a methyl or ethyl group, Z is a hydrogen atom or a methyl group, $1 \leq a \leq 4$, $2 \leq b \leq 4$, and $a+b \leq 6$, with at least one allyl group compound represented by the following general formula (II):

(II)

wherein $R_1$ is a phenol, or amine group.

2. A high-refractive plastic lens resin as claimed in claim 1, wherein a second allyl group compound represented by the formula (II), wherein $R_1$ is a hydroxyl group, is optionally also included in said addition reaction, and wherein said polyisocyanate and said at least one and said second allyl group compounds are reacted in such amounts that the $-NCO/(OH+-NH_2)$ molar ratio falls within the range from 0.45 to 0.50.

* * * * *